United States Patent
Dasika et al.

(10) Patent No.: US 7,242,859 B1
(45) Date of Patent: Jul. 10, 2007

(54) METHOD AND SYSTEM FOR PROVIDING PROTECTION IN AN OPTICAL RING COMMUNICATION NETWORK

(75) Inventors: Prasad Dasika, Linthicum, MD (US); Dan Spears, Linthicum, MD (US)

(73) Assignee: CIENA Corporation, Linthicum, MD (US)

( * ) Notice: Subject to any disclaimer, the term of this patent is extended or adjusted under 35 U.S.C. 154(b) by 738 days.

(21) Appl. No.: 10/625,609

(22) Filed: Jul. 24, 2003

Related U.S. Application Data

(60) Provisional application No. 60/398,276, filed on Jul. 24, 2002.

(51) Int. Cl.
*G02F 1/00* (2006.01)

(52) U.S. Cl. .............................. 398/3; 398/59; 398/56; 398/57; 398/66; 398/70; 398/71; 398/72; 398/83; 370/221; 370/222

(58) Field of Classification Search .................... 398/1, 398/2–5, 70–72, 83, 56, 57, 59, 67, 139, 398/66; 370/221, 222

See application file for complete search history.

(56) References Cited

U.S. PATENT DOCUMENTS

| | | | | |
|---|---|---|---|---|
| 6,567,194 | B1 * | 5/2003 | Badr | ............................. 398/1 |
| 2002/0181037 | A1 * | 12/2002 | Lauder et al. | .............. 359/110 |

\* cited by examiner

*Primary Examiner*—Kenneth Vanderpuye
*Assistant Examiner*—Guerssy Azemar
(74) *Attorney, Agent, or Firm*—Clements Walker; Christopher L. Bernard; Tyler S. Brown

(57) ABSTRACT

A method and system for providing tandem protection in a communication system. Path protection is provided using at least two redundant communication paths and selecting the communication having higher signal quality. Interface protection is provided through a protection transceiver thus implementing M:N equipment protection and 1+1 optical protection.

12 Claims, 5 Drawing Sheets

METHOD AND SYSTEM FOR PROVIDING PROTECTION IN AN OPTICAL RING COMMUNICATION NETWORK

This application claims priority on provisional Application No. 60/398,276 filed on Jul. 24, 2002, the entire contents of which are hereby incorporated by reference.

BACKGROUND OF THE INVENTION

1. Field of Invention

The invention relates generally to optical communication networks and in particular to methods and systems for providing protection in an optical communication network.

2. Description of Related Art

Communication networks often include protection mechanisms to reroute signals in the event of a service interruption. Primary causes of service interruption are link failures and networking equipment failures. Link failures may be caused by failure of the transmission medium, such as the cut of an optical fiber cable, or by failure of an active component that affects all the optical channels on a dense wavelength division multiplexed (DWDM) link, such as an optical amplifier. With carrier-class optical networking equipment, the most likely cause of equipment failure is failure of an isolated optical channel interface.

A variety of protection techniques exist in order to provide protection against service interruption. For example, a 1+1 protection scheme provides a redundant protection path for each working path. A switch at the receiving end of the working path can switch to receive the redundant signal on the protection path if signal quality is deteriorated on the working path. Another known protection scheme is 1:1 protection in which a protection path is associated with each working path, but the protection path is not utilized until signal quality is deteriorated on the working path. Another known protection scheme is 1:N protection in which a protection path is associated with multiple working paths. If signal deterioration is detected on one of the working paths, traffic is redirected to the protection path.

BRIEF DESCRIPTION OF THE DRAWINGS

Embodiments of the present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of embodiments of the invention refers to the accompanying drawings. The same reference numbers in different drawings identify the same or similar elements. Also, the following detailed description does not limit the invention. Instead, the scope of the invention is defined by the appended claims and equivalents thereof.

The invention may be used in a variety of communications networks, including electrical and optical networks, and combination electrical/optical networks. The expression "communicates" as used herein refers to any connection, coupling, link or the like by which signals carried by one system element are imparted to the "communicating" element. Such "communicating" devices are not necessarily directly connected to one another and may be separated by intermediate components or devices. Likewise, the expressions "connected" and "coupled" as used herein are relative terms and do not require a direct physical connection.

Figure 1:
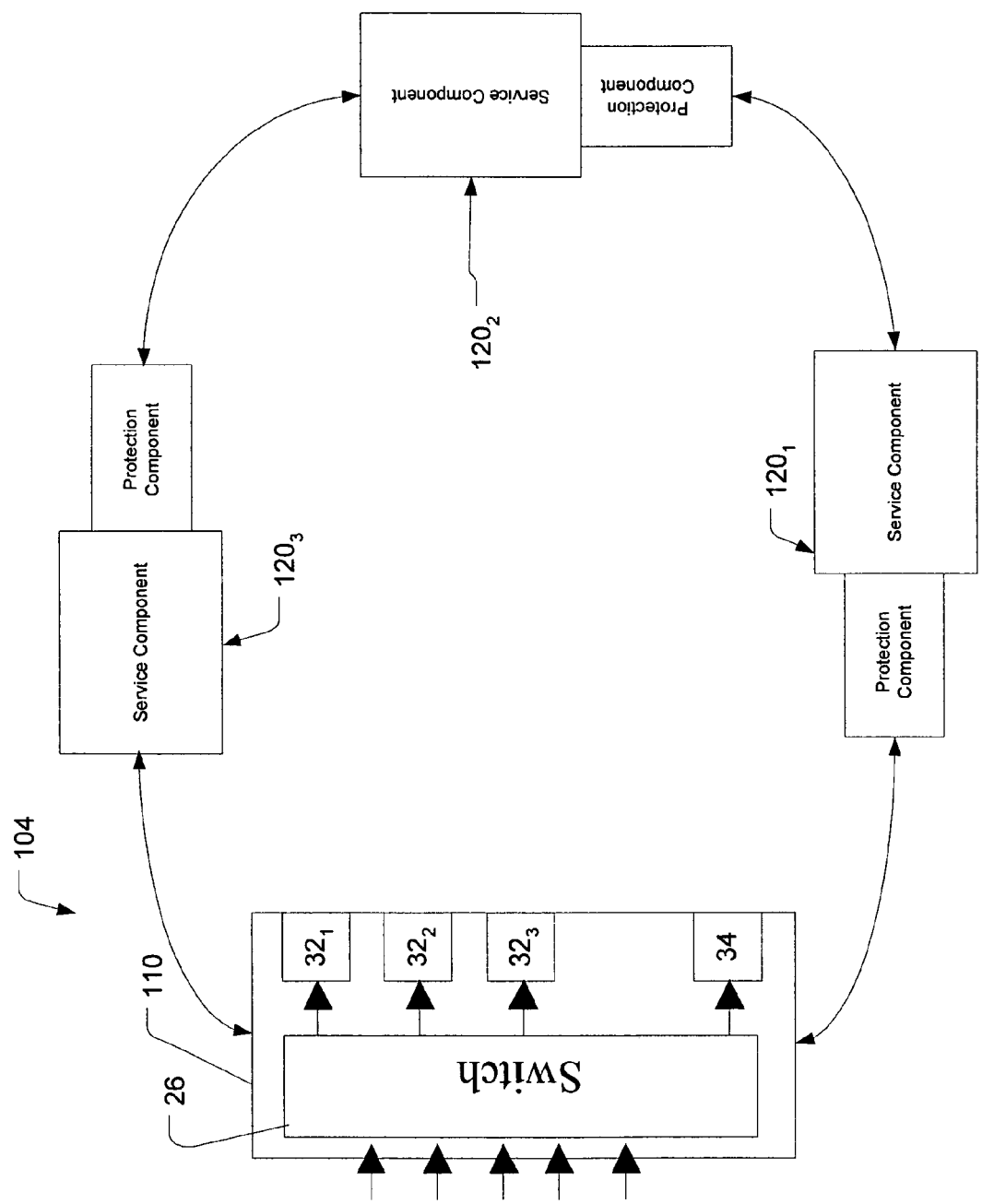
FIG. 1 is a block diagram of a communication network having a ring architecture in an alternate embodiment of the invention.

FIG. 1 is block diagram of a communication network 104 having a ring architecture. Shown in FIG. 1 is a hub network element 110 and a plurality of remote network elements 120 arranged in a ring configuration. Both the hub network element 110 and the remote network elements 120 transmit and receive signals in both the clockwise and counter-clockwise directions around the ring. The ring network may use wavelength division multiplexing (WDM) in which distinct wavelengths are used to define multiple channels on one path.

Figure 2:
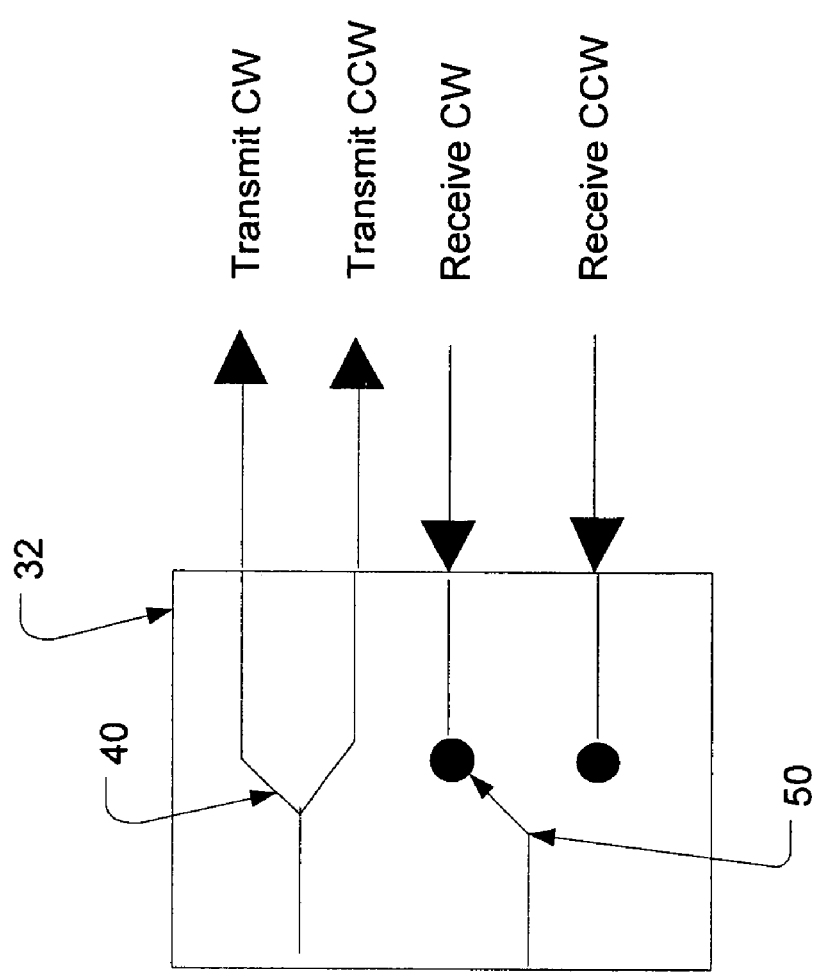
FIG. 2 is a block diagram of a portion of a transceiver at a hub network element.

FIG. 2 illustrates transmit and receive paths in transceivers 32 and 34. As described previously, an optical splitter 40 divides the transmitted signal into two diverse communication paths (clockwise and counter-clockwise). An optical selector 50 selects the higher quality signal received on the diverse communication paths. The clockwise and counter-clockwise paths provide the 1+1 optical path protection.

Figure 3:
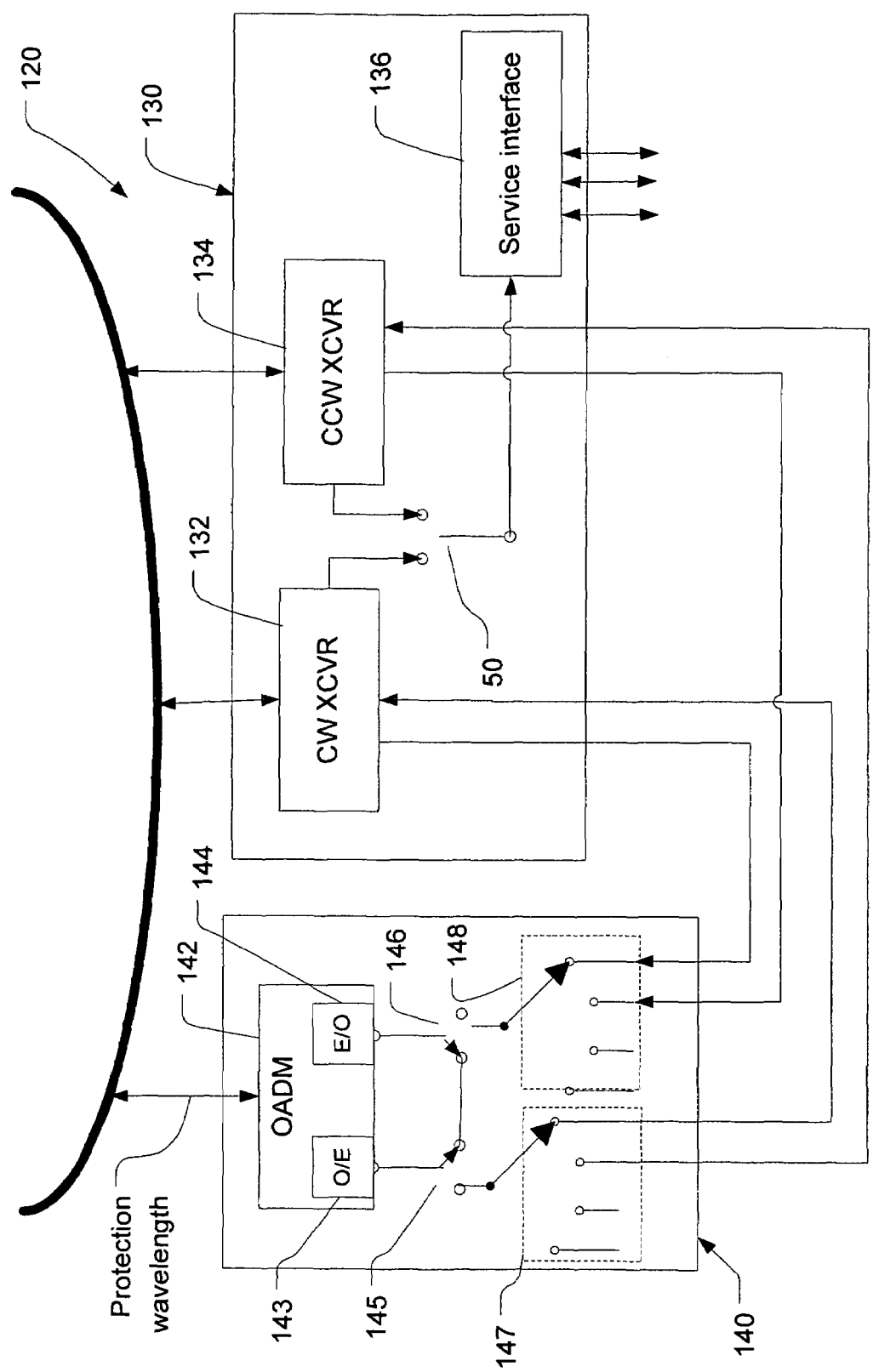
FIG. 3 is a block diagram of a remote network element of the communication network of FIG. 1.

FIG. 3 is block diagram of one remote network element 120. The remote network element includes a service component 130 and a protection component 140. The service component 130 includes a first receiver 132 for receiving signals on one of the diverse communication paths (e.g., clockwise). A second receiver 134 receives signals on the other diverse communication path (e.g., counter-clockwise). The received signal having the higher quality is selected by optical selector 50 and directed to a service interface 136. The service interface 136 provides an ingress and egress point to the ring network for users.

The protection component 140 is used when a transceiver 32 is not operational and protection transceiver 34 is activated. In an exemplary embodiment each transceiver 32 sends and receives signals on a separate wavelength. If one of transceiver 32 fails, protection transceiver 34 is activated to replace the missing wavelength. In one embodiment of the invention the protection transceiver 34 generates a signal around 1300 nm, such as 1310 nm.

The protection component 140 of remote node 120 includes an optical add/drop multiplexer 142 (OADM), an optical-to-electrical (O/E) converter 143 and an electrical-to-optical (O/E) converter 144. The OADM 142 selects a protection signal having the protection wavelength (e.g., 1310 nm) and directs the protection signal to the O/E converter 143. Switches 145 and 146 can couple the O/E converter 143 to the E/O converter 144 to place the OADM in loop-back mode. Alternatively, switches 145 and 147 may be configured to couple the O/E converter 145 to first and second transceivers 132 and 134 in the service component 130. Similarly, switches 146 and 148 may be configured to coupled the E/O converter 144 to first and second transceivers 132 and 134 in the service component 130. Thus, the protection component 140 serves as a protection transceiver. Operation of switches 145–148 are described in detail herein.

During normal operation, network element 110 receives traffic for distribution on the ring through switch 26. Switch 26 is programmed to distribute traffic to transceivers 32 as established through provisioning. The signals provided to the transceivers 32 are directed around the ring in both the clockwise and counter-clockwise directions. Transceivers 132 and 134 at the remote network elements 120 receive signals and either route the signals off the ring through optical selector 50 and service interface 136 or regenerate the signal and redirect the signal back on the ring.

FIG. 3 illustrates the status of the protection component 140 when the ring is in normal operation. Switches 145 and 146 are configured so that the output of O/E converter 143 is coupled directly to the input of E/O converter 144. This mode is referenced as loop-back mode. Any signal on the protection wavelength may be enhanced (e.g., subject to 3R regeneration of re-amplification, reshaping and retiming) and placed back on the ring for distribution to the next network element.

If one of the diverse communication paths (i.e., the clockwise or counter-clockwise) fails, the optical selector 50 in hub network element 110 and selector 50 in remote network elements 120 will select the signal having the higher signal quality. The diverse communication paths provide redundant signals in order to provide the optical path protection.

Figure 4:
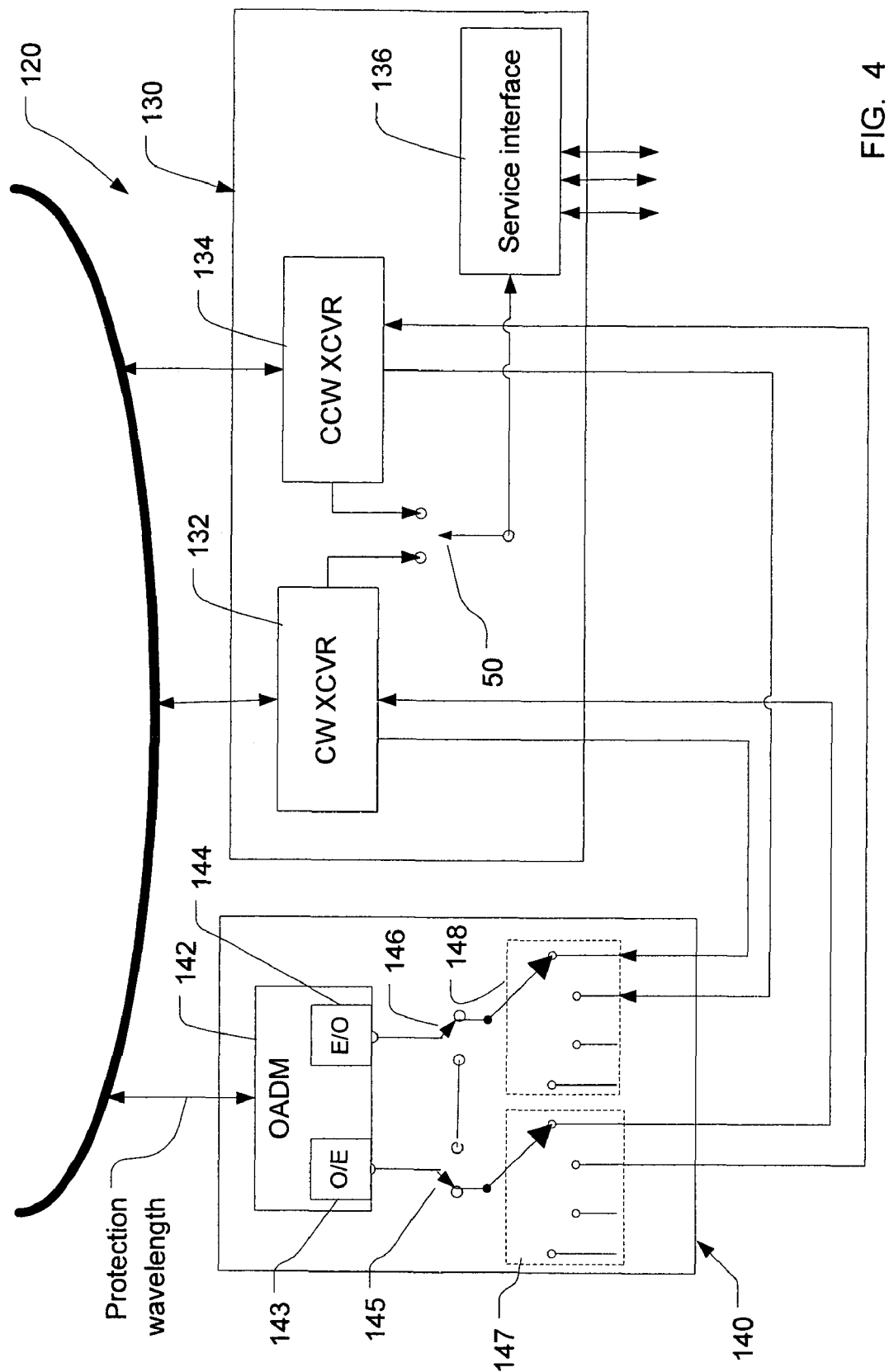
FIG. 4 is a block diagram of a remote network element of the communication network of FIG. 1; and, FIG. 5 is a block diagram of a communication network having a ring architecture in an alternate embodiment of the invention.

If a transceiver 32 in the hub network element fails, optical interface protection is enacted as follows. For illustration, assume that transceiver $32_1$ directing traffic to remote network element $120_1$ fails. The service component 130 detects a transceiver failure as both transceiver 132 and transceiver 134 experiencing a loss of signal (LOS). The service component 130 signals protection component 140 to enter a protection mode. As shown in FIG. 4, switch 145 is configured to coupled the O/E converter 143 to the receive input of transceivers 132 or 134. Switch 146 is configured to connect the E/O converter 144 to the transmit output of transceivers 132 or 134.

Similarly, hub network element 110 detects failure of transceiver $32_1$ and activates protection transceiver 34. As noted previously, protection transceiver 34 operates at a wavelength (e.g., 1310 nm) that is selected by OADM 142. Switch 26 directs incoming traffic destined for the failed transceiver $32_1$ to the protection transceiver 34. The protection transceiver 34 then transmits the signal on the protection wavelength in both directions around the ring.

The OADM 142 retrieves the protection wavelength from the ring and directs the received signal to clockwise transceiver 132 or counter-clockwise transceiver 134. Selector 50 selects the correct transceiver (CW or CCW) based on the configuration of switches 147 and 148 for distribution to the service interface 136. Incoming signals from the service interface 136 are directed to either the transceiver 132 or transceiver 134. The incoming signal is directed to the E/O converter 144 through switches 148 and 146. The E/O converter 144 puts the signal on the protection wavelength and the OADM 142 then places the signal on the ring. The remaining remote nodes $120_2$ and $120_3$ have the protection component 140 in loop-back mode and direct the protection wavelength back to hub network element 110. Once the protection wavelength is activated to carry active traffic, the system may be configured such that the protection wavelength is not available to any other remote node on the network or priorities may be established to ensure that the service with the highest priority always has protection available.

Figure 5:
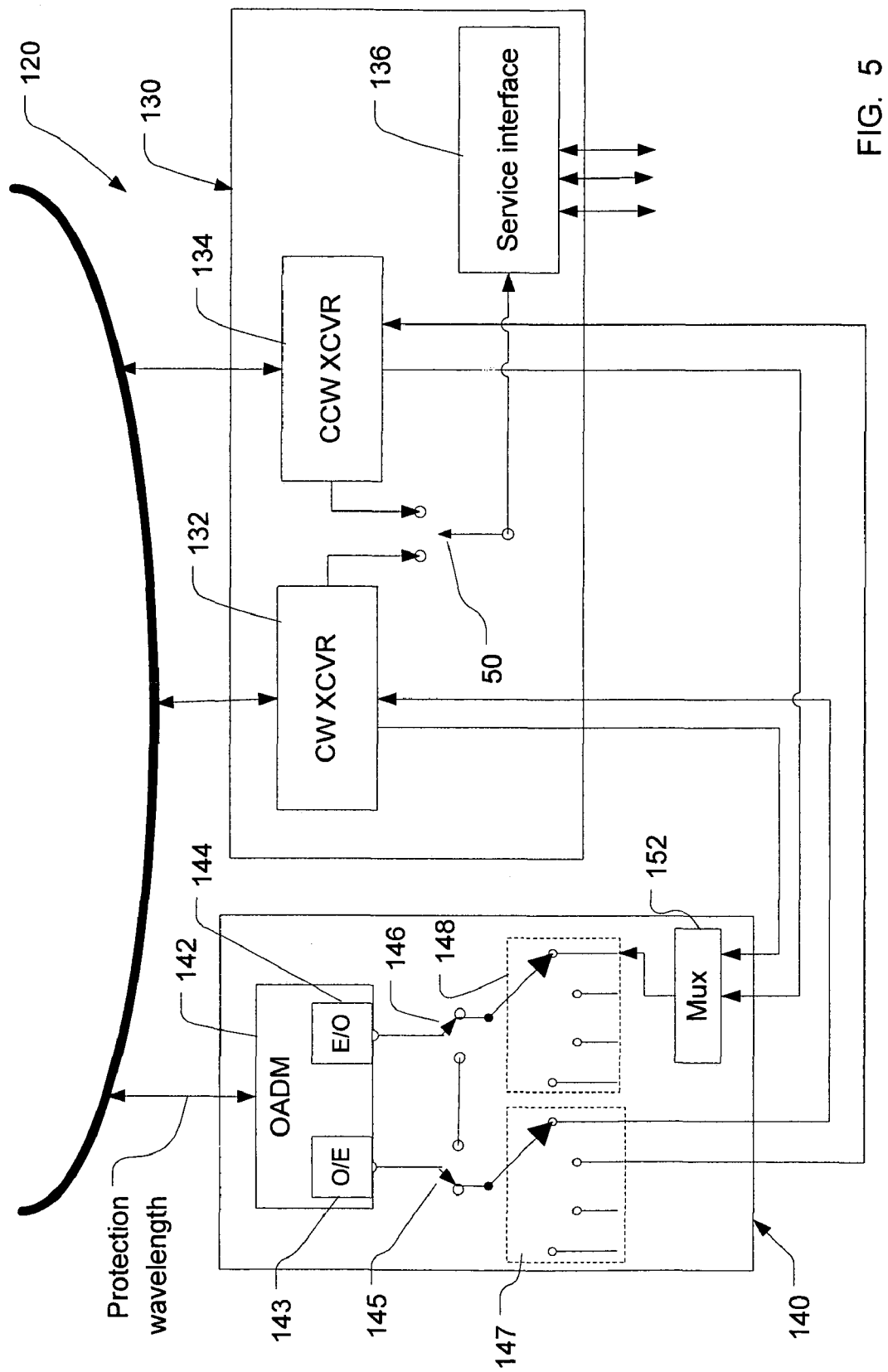

FIG. 5 depicts an alternate embodiment in which signals transmitted by transceivers 132 and 134 may be multiplexed by a multiplexer 152. For example, multiplexer 152 may combine multiple signals through time division multiplexing (TDM). This provides the ability to protect multiple wavelengths using the single protection wavelength.

The protection transceiver 34, OADM 142, O/E converter 143 and E/O converter 144 may operate at a protection wavelength around 1300 nm (e.g., 1310 nm). Such components are widely available and relatively inexpensive. Thus, effective 1:N protection may be achieved without substantial cost.

Embodiments of the invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A communication system providing tandem protection in a ring network, the system comprising:
    a hub network element having a transceiver transmitting and receiving a signal on said ring network in multiple directions to define a clockwise signal and a counter-clockwise signal and a protection transceiver transmitting and receiving a protection signal on said ring network in a clockwise direction and a counter-clockwise direction;
    at least one remote network element in communication with said hub network, said remote network element including a clockwise transceiver and a counter-clockwise transceiver;
    said remote network element including a selector for selecting a signal from one of said clockwise transceiver and said counter-clockwise transceiver for transmission to a service interface;
    said remote network element including a protection component for transmitting and receiving said protection signal generated by said protection transceiver;
    said protection component operating in a loop back mode when said transceiver of said hub network element is operational, said protection component coupling said protection signal to said clockwise transceiver and said counter-clockwise transceiver when said transceiver is not operational providing 1:N protection.

2. The communication system of claim 1 wherein:
    said hub network element includes a hub selector selecting one of said clockwise signal and said counter-clockwise signal for reception at said transceiver.

3. The communication system of claim 1 wherein:
    said protection signal has a protection wavelength different than a wavelength of said signal.

4. The communication system of claim 3 wherein:
    said protection component includes an optical add-drop multiplexer for selecting said protection wavelength.

5. The communication system of claim 4 wherein:
    said optical add-drop multiplexer includes an optical-to-electrical converter and input switch coupled to an input of said clockwise transceiver and to an input of said counter-clockwise transceiver.

6. The communication system of claim 4 wherein:
    said optical add-drop multiplexer includes an electrical-to-optical converter and an output switch coupled to an output of said clockwise transceiver and to an output of said counter-clockwise transceiver.

7. The communication system of claim 6 wherein:
said protection component includes a multiplexer disposed between said output of said clockwise transceiver and said output counter-clockwise transceiver and said output switch.

8. A method for providing tandem protection in a ring network, the method comprising:
- transmitting and receiving a signal on said ring network in multiple directions to define a clockwise signal and a counter-clockwise signal and transmitting and receiving a protection signal on said ring network in a clockwise direction and a counter-clockwise direction;
- at a remote network element, selecting one of said clockwise signal and said counter-clockwise signal for transmission to a service interface;
- at said remote network element, transmitting and receiving said protection signal, said protection signal being looped back when one of said clockwise signal and said counterclockwise signal is present, said protection signal being transmitted to said service interface when said clockwise signal and said counter-clockwise signal are not present providing 1:N protection.

9. The method of claim 8 wherein:
said protection signal has a protection wavelength different than a wavelength of said clockwise signal and said counter-clockwise signal.

10. The method of claim 8 further comprising:
performing an optical-to-electrical conversion prior to transmitting said protection signal to said service interface.

11. The method of claim 8 further comprising:
receiving a signal from said service interface and transmitting said signal on said protection signal;
performing an electrical-to-optical conversion prior to transmitting said signal on said protection signal.

12. The method of claim 11 further comprising:
multiplexing multiple signals from said service interface on said protection signal.

* * * * *